F. Monroe,

Harness,

No. 238. A.I. Patented May 24, 1859.

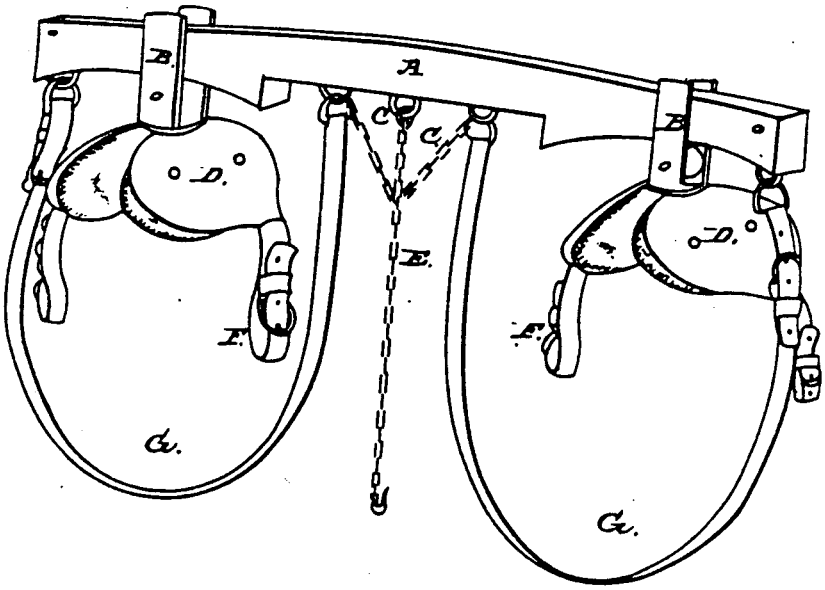

Witnesses.

C. F. Mallary

Geo B. Morton

Inventor.

Freedom Monroe

No. 238, to original Letters Patent No. 21,267.—*Improvement in Harnesses.*—I [illegible] bearing bar, the chain and braces attached thereto, and the padded swivel joint, to be used in combination with my improvement in harness, disclaiming the original invention heretofore patented.

FREEDOM MONROE.

DEPARTMENT OF COMMERCE
UNITED STATES PATENT AND TRADEMARK OFFICE

---

MISSING PAGE(S)

PATENT NUMBER AI 238 FOR THE ISSUE DATE 05/24/1859 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims